United States Patent
Chen et al.

(10) Patent No.: US 7,171,202 B2
(45) Date of Patent: Jan. 30, 2007

(54) VERIFYING CHECK-IN AUTHENTICATION BY USING AN ACCESS AUTHENTICATION TOKEN

(75) Inventors: Tianwei Chen, Berlin (DE); Changpeng Fan, Berlin (DE); Günter Schäfer, Berlin (DE)

(73) Assignee: Siemens Aktiengesellschaft, Munich (DE)

( * ) Notice: Subject to any disclaimer, the term of this patent is extended or adjusted under 35 U.S.C. 154(b) by 62 days.

(21) Appl. No.: 10/491,160

(22) PCT Filed: Sep. 30, 2002

(86) PCT No.: PCT/EO02/10962

§ 371 (c)(1),
(2), (4) Date: Nov. 19, 2004

(87) PCT Pub. No.: WO2004/034717

PCT Pub. Date: Apr. 22, 2004

(65) Prior Publication Data

US 2005/0079866 A1    Apr. 14, 2005

(51) Int. Cl.
*H04Q 7/20* (2006.01)
*H04M 1/66* (2006.01)
*G06F 15/16* (2006.01)

(52) U.S. Cl. .................... 455/435.1; 455/410; 709/230

(58) Field of Classification Search ............ 455/435.1, 455/410, 436, 438, 433, 445, 416, 422, 432, 455/448, 449, 415, 422.1, 432.1; 709/230, 709/238, 249, 204; 370/331, 260, 352, 353, 370/389, 328, 401, 312, 351, 390, 400, 432
See application file for complete search history.

(56) References Cited

U.S. PATENT DOCUMENTS

| | | | | |
|---|---|---|---|---|
| 6,775,225 B2 * | 8/2004 | Nakade et al. | ........... | 369/271.1 |
| 6,859,448 B1 * | 2/2005 | Roy | ........................... | 370/338 |
| 6,891,819 B1 * | 5/2005 | Inoue et al. | ................. | 370/338 |
| 2003/0163733 A1 * | 8/2003 | Barriga-Caceres et al. | . | 713/201 |
| 2003/0224792 A1 * | 12/2003 | Verma et al. | ................ | 455/436 |
| 2005/0069171 A1 * | 3/2005 | Rhoads et al. | .............. | 382/100 |

FOREIGN PATENT DOCUMENTS

WO    WO 01/22685    3/2001

OTHER PUBLICATIONS

Authentication of Mobile Users; IEEE Network, IEEE Inc. New York, US Refik Molva et al. pp. 26-34.
Authentication of Wireless Communications, Hung-Yu Lin et al. pp. 550-552.
Security in Mobile Systems, Reliable distributed systems, 1998 Vineeth Subramany AM et al. pp. 407-412.

* cited by examiner

*Primary Examiner*—Melody Mehrpour
(74) *Attorney, Agent, or Firm*—Morrison & Foerster LLP

(57) ABSTRACT

A simple and efficient means of checking the registration authorization is proposed by the method and the device for checking the registration authorization prior to the start of the re-registration process based on a registration query from a mobile radio terminal to at least one access device for an intra-domain handover in a mobile communication network. In the network, a token which has been sent by an access device to a mobile radio terminal and has been stored in at least one trust table of at least one access device, is received by at least one further access device during a registration query from a mobile radio terminal and compared with tokens stored in at least one trust table prior to the start of the registration for the purpose of verifying the registration authorization, and the registration is started if an authorization is present.

24 Claims, 6 Drawing Sheets

VERIFYING CHECK-IN AUTHENTICATION BY USING AN ACCESS AUTHENTICATION TOKEN

CLAIM FOR PRIORITY

This application claims priority to International Application No. PCT/EP02/10962, which was published in the German language on Sep. 30, 2002.

TECHNICAL FIELD OF THE INVENTION

A method for defending against DoS attacks on optimized handover procedures, and in particular, which support quality of service aspects using regionally valid cryptographic authentication tokens.

BACKGROUND OF THE INVENTION

SUBRAMANYAM V ET AL: "Security in mobile systems" Reliable Distributed Systems, 1998, Proceedings, Seventeenth IEEE Symposium on West Lafayette, Ind., USA 20–23 Oct. 1998, Los Alamitos, Calif., USA, IEEE Comput. Soc, US, Oct. 20, 1998 (1998–10–20), pages 407–412, XP010319125 ISBN: 0-8186-9218-9, discusses requirements for mobility in a network and the expansion of existing security schemes. For users, it can be important to have round-the-clock access to information in a network, even when they are mobile, for example, a doctor who constantly needs to monitor the health of a patient. Communication in such cases typically takes place over wireless connections and it is difficult to guarantee security during the exchange of messages. Typical objectives for secure computing in the past were the archiving of confidentiality, integrity, availability, legitimacy and accountability.

Quality of Service (QoS) mechanisms guarantee service characteristics, such as the end-to-end run time, etc., in networks that support mobile Internet communication. In these networks, the mechanisms are exposed to the threat of what are called "Denial of Service" (DoS) attacks aimed at reducing the availability of services for legitimized users. A threat resides in the fact that QoS signaling mechanisms are used to activate mobile nodes for queries to a network, which is equivalent to a reservation of resources. If the network cannot effectively check the "credibility" of QoS queries, for example by querying the origin and authorization of an query from a mobile node, the performance of the network can be reduced due to bogus QoS queries. A mobile radio terminal leaves, for example, its home network and switches to a network with HMIPv6 interface and an AAA architecture. In the process, it is assumed that a security association (SA) always exists between the mobility anchor point (MAP) and each access router (AR), between the local AAA server (AAAL) and each access router (AR), between the MAP and the AAAL, and between one access router and the other access routers. Once a mobile radio terminal has successfully registered, its authentication and authorization information (AA) is stored in a local AAA server (AAAL) and its identity is known to the MAP and to the access router (AR) with which the mobile radio terminal first registered. Thereafter, the mobile radio terminal can move between the coverage areas of the access routers (AR) without any interruption to a communication. In order to optimize the intra-domain handover, the waiting time (latency) for the registration with the individual access routers must be minimized as far as possible.

Generally, DoS attacks prevent or block normal usage or administration of communication facilities (or other services). In most cases denial-of-service (DoS) attacks have a specific objective. Thus, for example, DoS attacks can cause the collapse or shutdown of the entire network or a degradation of performance by overloading the network with a high number of transmitted bogus messages. All mobile radio terminals in an access network can send QoS queries to all nodes along the communication path in order to reserve resources. This means that attackers, too, can send QoS queries in the access network. For this reason an access device, such as, say, an access router, must check the "credibility" of a QoS query from a mobile radio terminal before it processes the query further. If an access device does this with the aid of the local AAA server prior to the start of the reservation process, there is a significant waiting time for the re-registration process. When a mobile radio terminal switches from the coverage area of one access router to the coverage area of a different access router in the access network (intra-domain handover), no interruptions should ensue between mobile radio terminal and access network. While the mobile radio terminal maintains the connection to the first access router, it initiates a new registration process with a further access router by sending binding update (BU) messages. If no check is made beforehand to verify whether the mobile radio terminal is a registered user in the access network, attackers can overload the access network therewith, for example by wasting computing capacity with queries concerning authentication and authorization or by reserving resources for bogus queries, etc.

SUMMARY OF THE INVENTION

The invention relates to a method and a device for checking the registration authorization prior to the start of authentication and authorization processes based on a registration query from a mobile radio terminal to at least one access device for an intra-domain handover in a mobile communication network.

The present invention therefore guarantees optimum performance of the communication network by providing effective protection against bogus queries.

In one embodiment of the invention, during an intra-domain handover, prior to the start of binding update and re-authentication and re-authorization processes (AAA processes), a check of the registration authorization takes place by means of an authentication token in order to preempt DoS attacks. The advantages of this method are a short waiting time for re-registration processes and effective protection against DoS attacks. By means of this method it is possible to avoid the memory of the access router being filled as a result of a DoS attack (the DoS attack attempts to fill the memory of the system under attack and thereby render the system unable to accept any further legitimate queries), the performance of the signaling capacity in the access network being degraded due to bogus queries, and the unauthorized seizing of resources in the local AAA server by bogus queries. The reduction of the risks by repeated transmission of authentication tokens, such as a cookie for example, can be achieved on the basis of a tightly limited area of validity in which the token is accepted.

BRIEF DESCRIPTION OF THE DRAWINGS

The invention will be explained in more detail below with reference to exemplary embodiments represented in the drawings, in which.

DETAILED DESCRIPTION OF THE INVENTION

Figure 1:
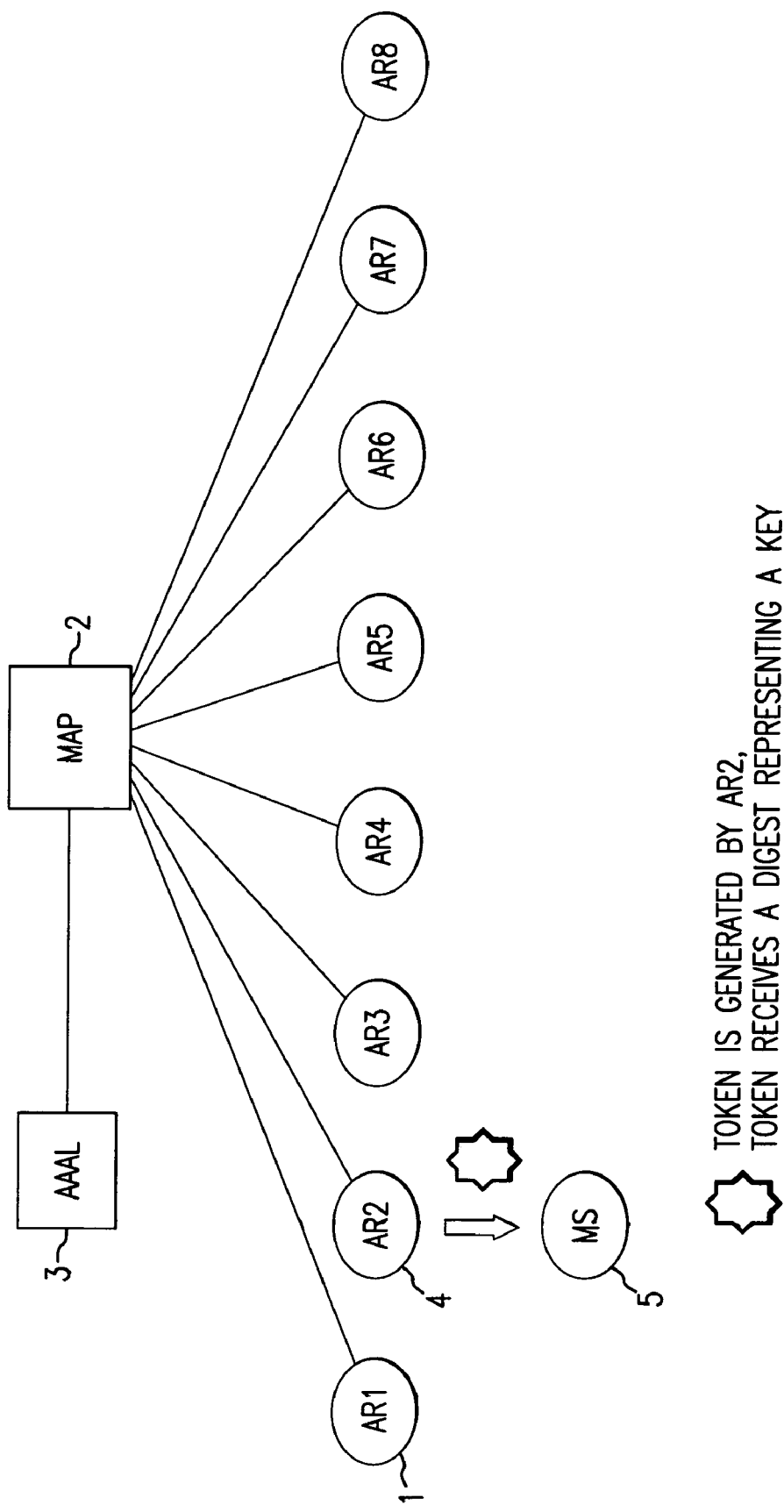
FIG. 1 shows how the first token is sent to the mobile radio terminal.

FIG. 1 shows how the mobile radio terminal 5 sends a first registration query to an access router 4 when it (5) is switched on or when it (5) first registers with the access network. Once the local AAA server has received the positive authentication and authorization information from the home AAA server, it informs the mobility anchor point (MAP) 2 of the successful authentication and authorization check. The mobility anchor point (MAP) 2 then sends the session key which was generated by the home AAA server and forwarded with the authentication and authorization information to the access router 4 so that the access router can set up a security association with the mobile radio terminal 5. The access router 4 generates a token, encrypts it by means of the session key, and sends it to the mobile radio terminal 5. The mobile radio terminal 5 receives the session key safely from the home AAA server with the aid of a long-term security association.

Here, tokens are always generated by an access router. The mobile radio terminal 5 receives the first token from the access router with which the mobile radio terminal 5 registers or performs an intra-domain handover, i.e. after successful registration the token encrypted by means of the session key is established between the mobile radio terminal 5 and access routers of the access network and transmitted by an access router 4 to the mobile radio terminal 5 together with the binding update message. Each access router 4 has at least one trust list 7. In one trust list 7 (trusted list) information is stored concerning the access routers 1, 6 whose tokens will be accepted, and in a different trust list 7 (trusting list) information is stored about the access routers 1, 6 which will accept the tokens of the generating access router 4. The tokens already used can be stored in a third trust list 7. This is where the tokens which have already been successfully used once by a mobile radio terminal are stored. By this means, it is ensured that a token is "invalidated" after a one-time use and cannot be used repeatedly. The purpose served by the two other trust lists is that each token used does not need to be stored in every access router 1, 4, 6 of the entire access network, but only in the access routers 1, 4, 6 which reside in the areas of validity implemented by means of the two trust lists (trusted list and trusting list). Without the restriction on the area of validity the method would not scale for large access networks. It accepts tokens that have been generated by the access routers 4 which are included in its trust list. A further trust list 7 includes the access routers which will accept the tokens generated by this access router 4. In order to increase security, an access router 4 stores the tokens of its neighboring access routers in a trust list. In this way, a limited area of validity is created for the acceptance of a token, since an access router 4 accepts its own self-generated tokens and those generated by a neighboring access router 6.

When a mobile radio terminal 5 wants to perform an intra-domain handover, it (5) adds the token of the re-registration query and (5) sends it as text to the new access router 6. The new access router 6 executes three actions in order to check the token:

Check of the term of validity for the expiry time of the token;

Check, by reference to a trust list 7, of the identity of the access router which generated the token;

Following the check of the aforementioned points, a random number suffix (key-hashed digest) is computed with the token information using the token key and compared with the key-hashed digest already present in the token.

If the check on the token is successful, the binding update and re-authorization processes are launched. The new access router 6 will authenticate the re-registration query when it receives the session key which is included in the re-registration query (BU ACK message) from the mobility anchor point (MAP) 2. If the verification fails, the access router 6 will not process the re-registration query any further. If, after a certain delay, the mobile radio terminal 5 has still not received any response regarding the re-registration of the access router 6, the mobile radio terminal 5 starts an authorization and authentication process via the local AAA server 3 and the home AAA server, as in the case of an intradomain handover or when the device 5 is switched on. As a result, however, it (5) cannot use the optimized handover process.

A new token is generated with the session key by the access router 6 and sent to the mobile radio terminal 5 for the next intra-domain handover, provided the re-authentication process did not fail. The old token cannot be re-used. Following verification of the token, the access router 6 informs the access router 4 which generated the token about the use of the token. The access router 4 which generated the token informs the access routers 1, 6 in its trust lists 7, except for the access router 6 which used the token, in order to prevent a second use of the token. When the token reaches its expiry time for the validity of the token, the token is deleted from the trust lists 7 of the access routers 1, 4, 6. A token includes the token information and the key-hashed digest (hash code). The token information includes:

The identity of the mobile radio terminal 5: the one-time identification of the mobile radio terminal 5 in the access network; this can be a unique identification which a mobile radio terminal 5 receives after its first registration.

The identity of the access router which generated the token: The one-time (=only used once, unique) access router identification can be its IP address or some other unique means of identification in the access network.

The generation time for creation of the token is used to limit the term of validity of the token.

A random number: This is used in order to differentiate two tokens that were generated at the same time.

A key-hashed digest message is an extract from the token information and the token key. The key-hashed digest can be computed either by the function HMAC-MD5 or by the function FIMAC-SHA1. The token key is distributed to each access router by the mobility anchor point (MAP) 2 and periodically updated.

A token therefore looks as follows:

Token:=token information, token key-hashed digest

Token information:=(identity of the mobile radio terminal, identity of the generating access router, generation time, random number)

Token key-hashed digest:=HMAC (token key, token information)

Figure 2:
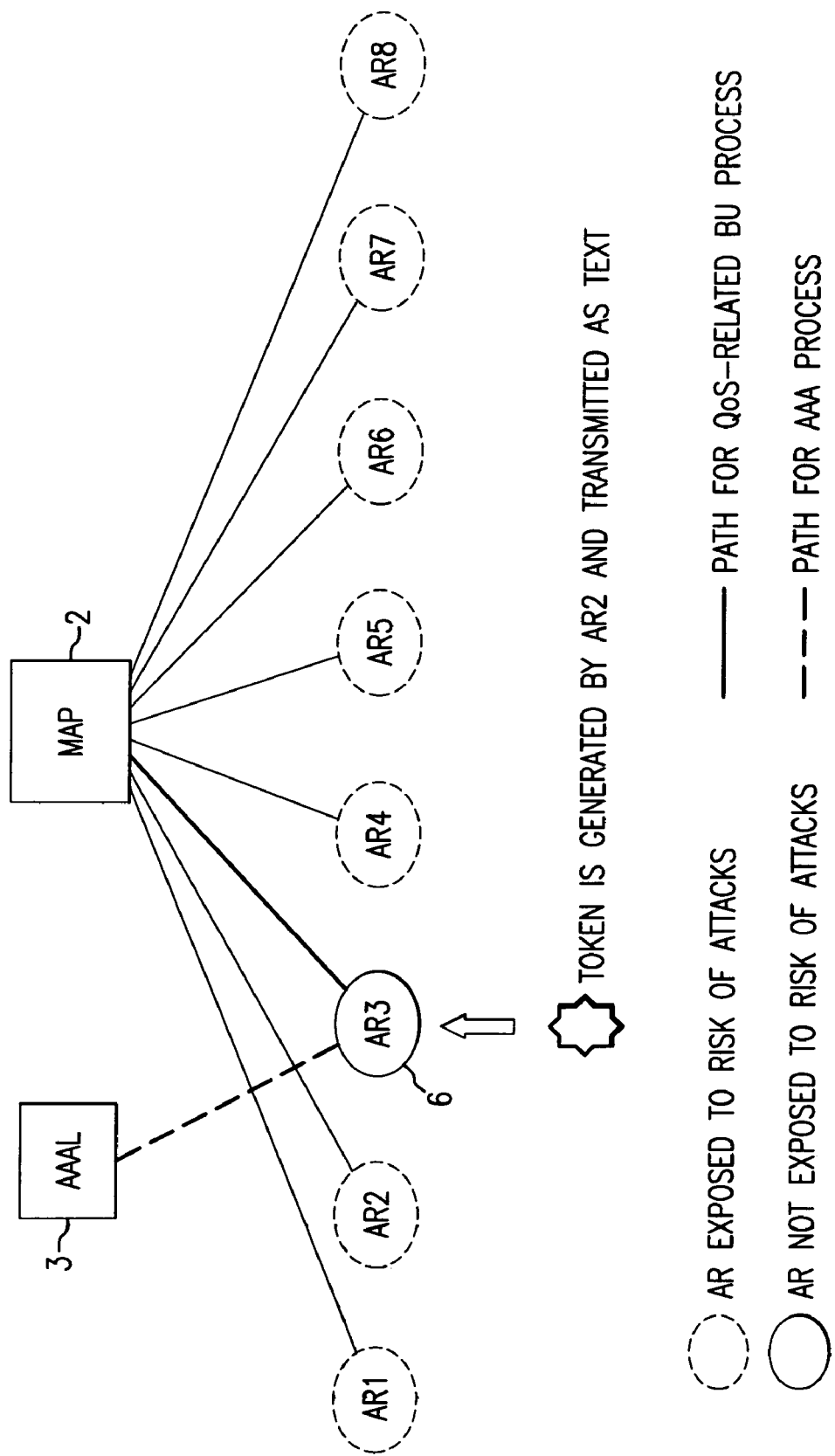
FIG. 2 shows how the previously generated token is sent to a further access device without limitation of the area of validity and without a usage indicator.

FIG. 2 shows the case where the area of validity for a generated token is the entire access network. When a token is sent to an access router 6 for its first use, it (6) is safe from DoS attacks since it (6) is the one that knows that the token has been used and so it (6) can prevent a second use of the token. Other access routers 1, 4 which have no information about the use of the token could be in danger of not noticing a DoS attack because the access router 6 has not passed on the information about the use of the token in the access network. On the other hand, passing the information about the use of the token to the entire access network causes a very great deal of signaling traffic in the access network.

Figure 3:
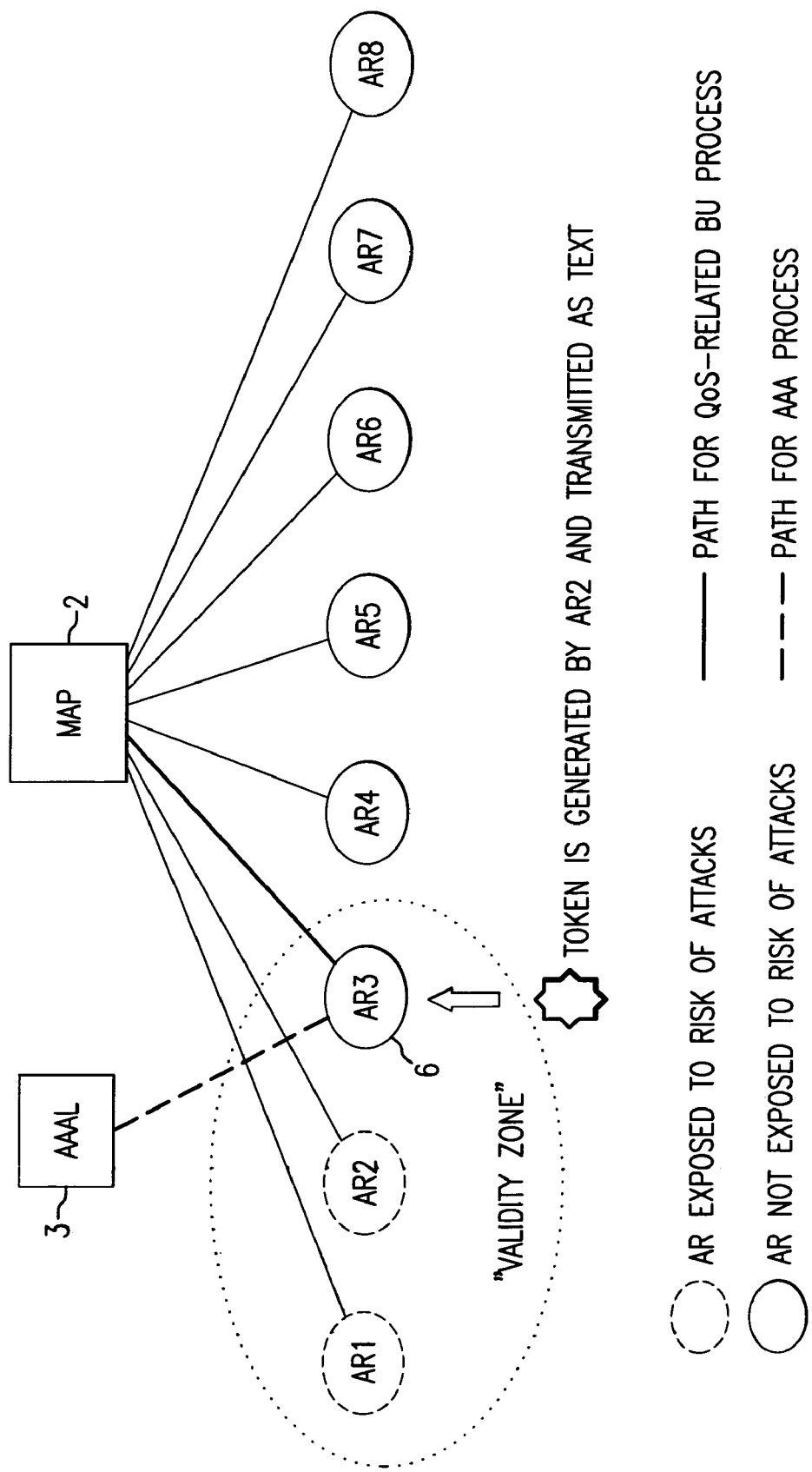
FIG. 3 shows how the previously generated token is transmitted without a usage indicator in a limited area of validity.
Figure 4:
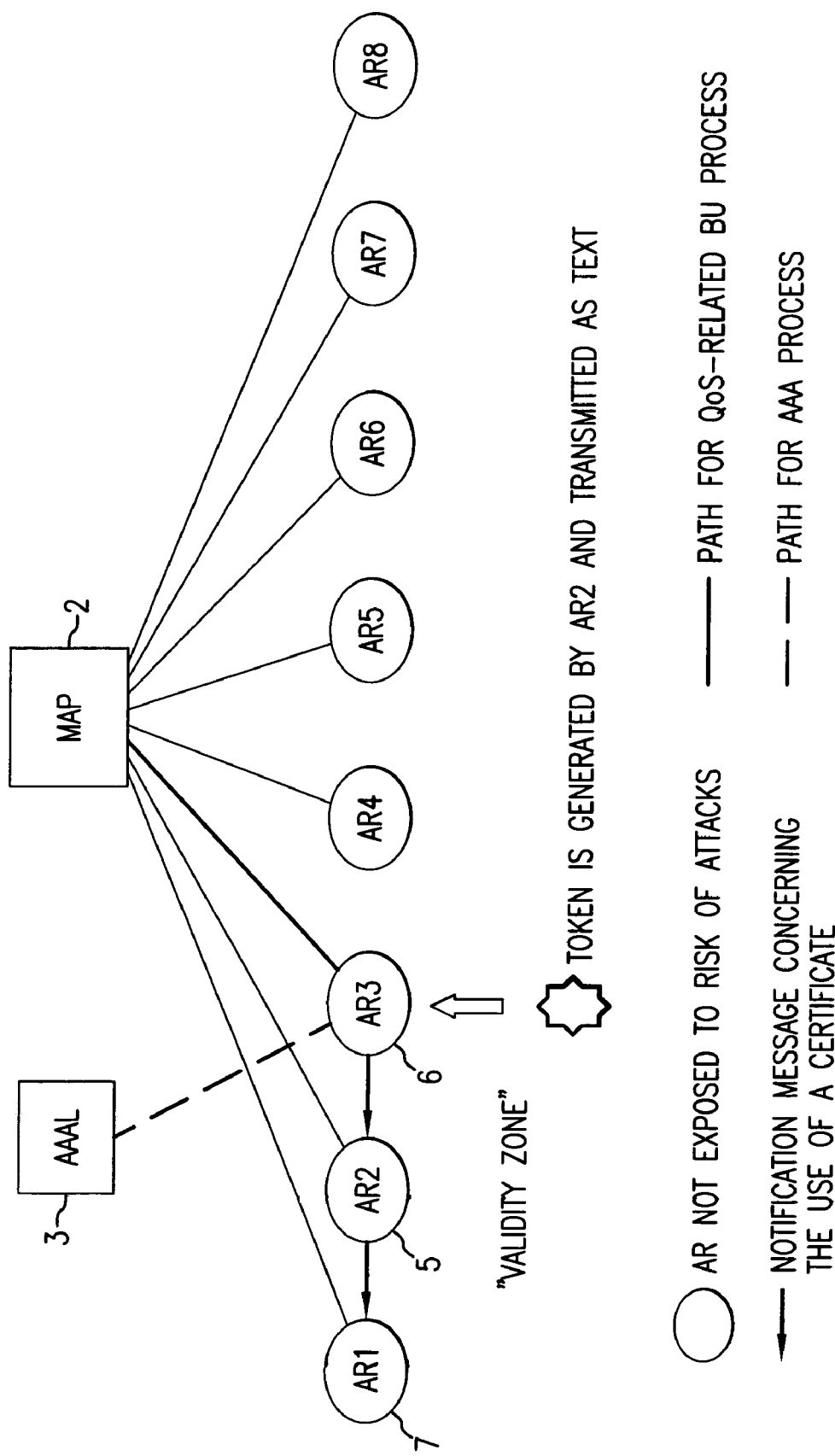
FIG. 4 shows how the previously generated token is transmitted with a usage indicator in a limited area of validity.

FIGS. 3 and 4 show how each access router enters its two neighboring access routers and itself in at least one trust list in order to reduce the area of validity of the token. For example, access router 4 enters the access routers 1 and 6 and itself in at least one trust list. This ensures that the token generated by the access router is accepted by the access routers 1, 4 and 6. The access router 4 possesses security associations with the access routers 1, 6, and each access router 4, 1 and 6 has at least one trust list 7 including information which indicates which tokens it (4) will accept from which access routers 1, 4 and 6.

The mobile radio terminal 5 receives a token generated by the access router 4 and sends it to an access router 6 for an intra-domain handover. Following successful checking of the token the binding update and AAA processes start. The access routers that are not included in the trust list 7 of the access router 4 (e.g. all other access routers except 1, 4 and 6) are not in danger of receiving a repeated token which has already been used. The access router 6 which used the token is also aware of its use, i.e. only the access routers 1 and 4 are still at risk in the event of any DoS attack, as they would still accept this token.

Figure 5:
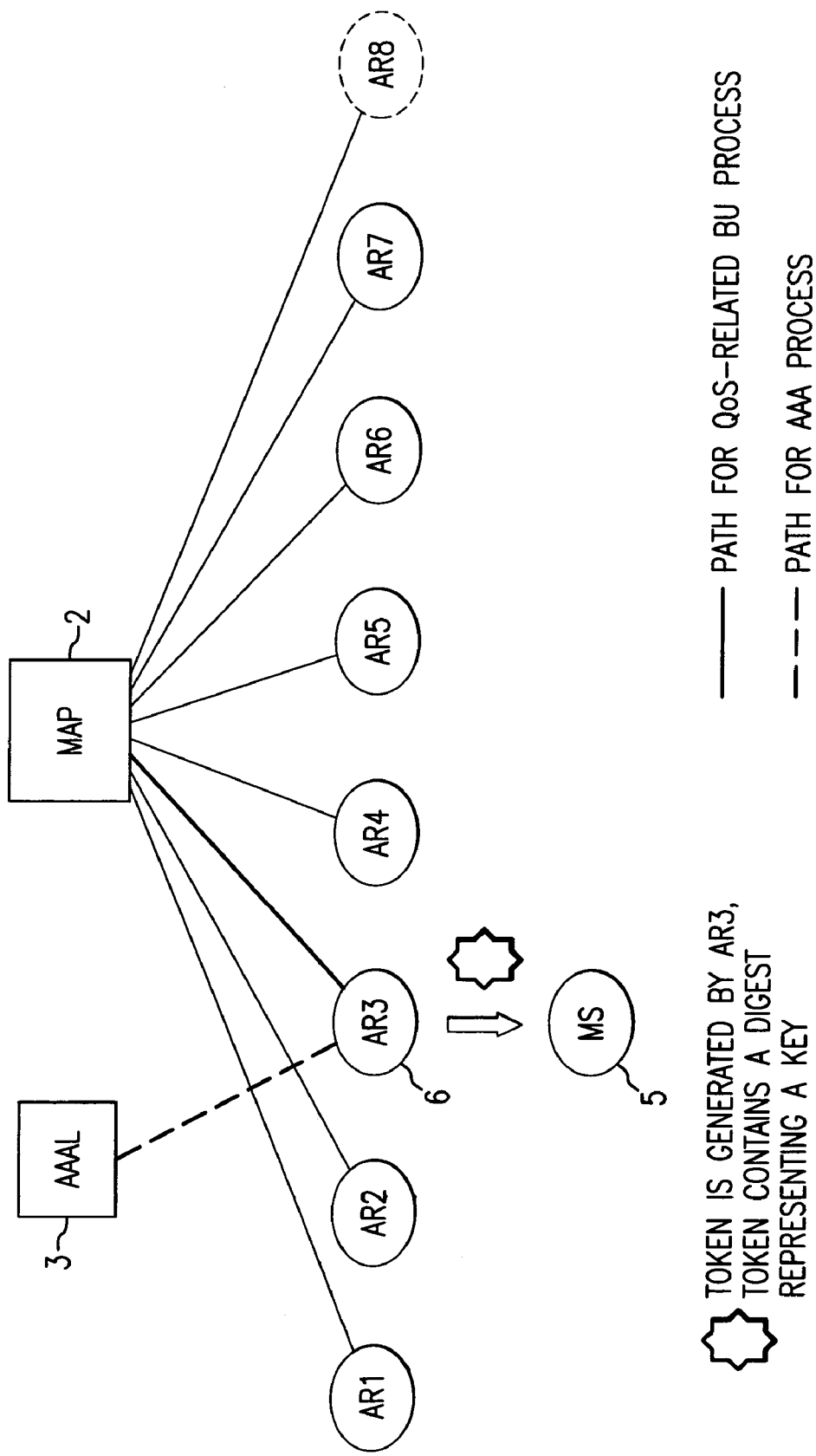
FIG. 5 shows how a token is sent to a mobile radio terminal following an intradomain handover.

FIG. 5 shows how the access router 6, after it (6) has accepted the token, immediately sends information to the access router 4 which generated the token. The access router 4 then informs the access router 1 in its trust list 7 and the access router 6 so that the latter 6 will accept no further copies of the token.

If the check on the token fails, the re-registration process will not be started. Otherwise, it is started simultaneously with the binding update process and the re-authorization process. When a re-registration query (BU ACK message) including the session key arrives at the access router 6, the latter (6) checks a digital signature which was created by a mobile node over the entire run time of the QoS query including the session key in relation to the re-authentication. Following a successful check of the token the access router 6 adds a new token encrypted by means of the session key to the re-registration query (BU ACK message) and sends it to the mobile radio terminal 5.

Figure 6:
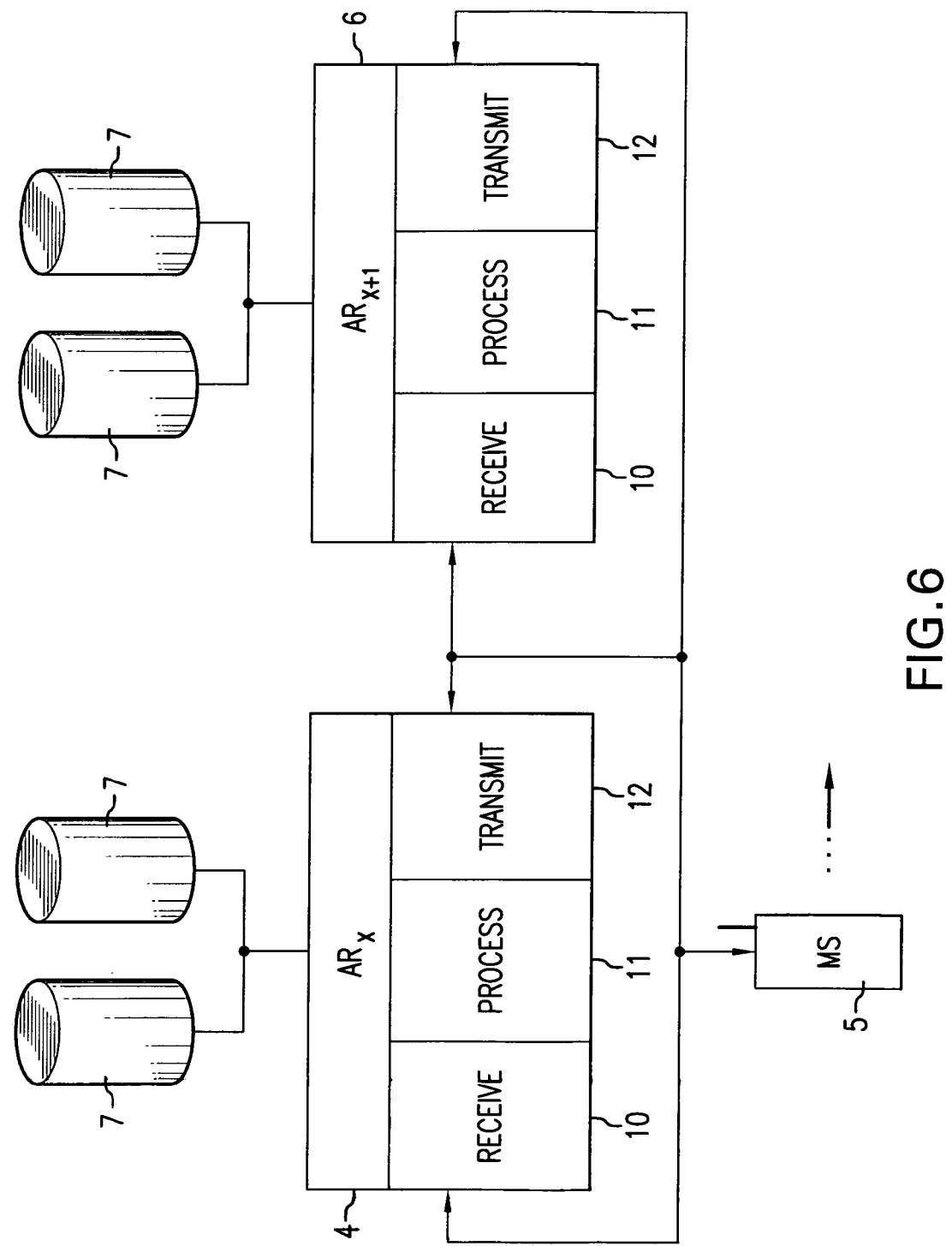
FIG. 6 shows a schematic for a device for sending and checking tokens.

FIG. 6 shows how an access router 4 generates a token by means of a processing unit 11 and sends it by means of a transmitter unit 12 to a mobile radio terminal. Tokens that have been generated by further access routers 6 are forwarded via a receiver unit 10 to a processing unit 11, which sends them to a further trust list 7. Each access router (4, 6) has at least one trust list. Information about the access routers (1, 6) whose tokens will be accepted is stored in a trust list 7 (trusted list), while information about the access routers (1, 6) which will accept the tokens of the generating access router (4) is stored in another trust list 7 (trusting list). The already used tokens are stored in a third trust list 7. In this list are stored tokens which have already been successfully used once by a mobile radio terminal. If a mobile radio terminal 5 wants to perform an intra-domain handover, it (5) adds the token to the re-registration query and (5) sends it as text to the new access router 6. The new access router 6 receives the token via a receiver unit 10 and forwards it for checking to a processing unit 11. The processing unit 11 executes three actions in order to check the token:

Checks the period of validity for the expiry time of the token;

Checks, by consulting a trust list 7, the identity of the access router which generated the token;

Following the two aforementioned checks, a random number suffix (key-hashed digest) is computed with the token information using the token key and compared with the key-hashed digest which is already present in the token.

If the token check is successful, the binding update and re-authorization processes are started. The new access router 6 will authenticate the re-registration query if it receives the session key which is contained in the re-registration query (BU ACK message) from the mobility anchor point (MAP) 2 via a receiver unit 10. If the verification fails, the access router 6 will not process the re-registration query any further. If the mobile radio terminal 5 has still not received an answer about the re-registration from the access router 6 via a transmitter unit 12 after a certain time, the mobile radio terminal 5 must start an authorization and authentication process via the local AAA server 3 and the home AAA server, as in the case of an intra-domain handover or when the device 5 is switched on.

What is claimed is:

1. A method for checking the registration authorization prior to a start of a re-registration process based on a registration query from a mobile radio terminal to at least one access device for an intra-domain handover in a mobile communication network, comprising:

receiving a token, which has been sent by an access device to a mobile radio terminal and has been stored in at least one trust table of at least one access device, by at least one further access device during a registration query from a mobile radio terminal;

comparing the received token with tokens stored in the at least one trust table prior to the start of the registration to verify the registration authorization; and starting the registration if the registration authorization is verified and the token is invalidated after one-time use and is not used repeatedly.

2. The method according to claim 1, wherein the token is encrypted by means of a key and transmitted to a mobile radio terminal.

3. The method according to claim 1, wherein the registration authorization check is performed prior to the start of the re-registration processes.

4. The method according to claim 1, wherein the binding update process is used for the re-registration process.

5. The method according to claim 1, wherein the authentication and authorization process is used for the re-registration process.

6. The method according to claim 1, wherein the authentication and authorization process and a binding update process are used simultaneously for the re-registration process.

7. The method according to claim 1, wherein at least one access device is an access router.

8. The method according to claim 1, wherein renewal of a binding process is started following successful checking of the authorization by the at least one access device.

9. The method according to claim 1, wherein renewal of the authorization and authentication process is started following successful checking of the authorization by the at least one access device.

10. The method according to claim 1, wherein the token is sent with a message for renewal of a binding between the at least one access device and the mobile radio terminal.

11. The method according to claim 1, wherein the at least one access device sends the token received from the mobile radio terminal to a neighboring access device.

12. The method according to claim 1, wherein the at least one access device sends the token received from the mobile radio terminal to a neighboring access device which is stored in a trust list.

13. The method according to claim 1, wherein the at least one access device stores tokens received from neighboring access devices in the at least one trust table.

14. The method according to claim 1, wherein used tokens are stored in the trust table.

15. The method according to claim 1, wherein the mobile radio terminal sends the token to a further of the at least one access devices during an intra-domain handover.

16. The method according to claim 1, wherein a further of the at least one access devices checks the token according to a period of validity of the token.

17. The method according to claim 1, wherein a further of the at least one access devices checks the token according to generation of the token.

18. The method according to claim 1, wherein a token suffix representing a key is compared with a key computed by the at least one access device.

19. The method according to claim 1, wherein a token includes an identity of the mobile radio terminal.

20. The method according to claim 1, wherein a token includes an identity of the access device generating the token.

21. The method according to claim 20, wherein the token includes a generation time.

22. The method according to claim 20, wherein the token includes a random number.

23. The method according to claim 20, wherein the token includes a digest representing a key.

24. A device for checking the access authorization at a start time of authentication and authorization processes based on a registration query from a mobile radio terminal to at least one access device for an intra-domain handover in a mobile communication network, comprising:

a receiver unit to receive a token and a query concerning the authorization for access by a mobile radio terminal;

a processing unit to generate tokens which are invalidated after one-time use and is not used repeatedly and to check received tokens;

at least one trust table to store generated tokens and tokens received by at least one access device; and a transmitter unit to send generated tokens to the mobile radio terminal and at least one further access device and to forward the access authorization to further network units.

* * * * *